(12) United States Patent
Coleiro et al.

(10) Patent No.: US 12,123,540 B2
(45) Date of Patent: Oct. 22, 2024

(54) COUPLING DEVICE AND METHOD

(71) Applicant: L'Air Liquide, Société Anonyme pour l'Etude et l'Exploitation des Procédés Georges Claude, Paris (FR)

(72) Inventors: Gaëtan Coleiro, Grenoble (FR); Yan Pennec, Grenoble (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 151 days.

(21) Appl. No.: 17/987,494

(22) Filed: Nov. 15, 2022

(65) Prior Publication Data

US 2023/0151919 A1   May 18, 2023

(30) Foreign Application Priority Data

Nov. 15, 2021  (FR) ..................... 2112048

(51) Int. Cl.
*F16L 59/18* (2006.01)
*F16L 59/065* (2006.01)

(52) U.S. Cl.
CPC .......... *F16L 59/188* (2013.01); *F16L 59/065* (2013.01)

(58) Field of Classification Search
None
See application file for complete search history.

(56) References Cited

U.S. PATENT DOCUMENTS

| | | | |
|---|---|---|---|
| 3,152,452 A | | 10/1964 | Bond, Jr. et al. |
| 3,842,614 A | * | 10/1974 | Karcher ................. F16L 37/32 137/614.04 |
| 6,082,400 A | * | 7/2000 | Tocha ..................... F16L 39/00 62/50.7 |
| 9,416,902 B2 | * | 8/2016 | Von Keitz ........... F16L 55/1015 |
| 9,909,703 B2 | * | 3/2018 | Van Scyoc ............. F16L 37/32 |
| 11,067,209 B2 | * | 7/2021 | Heinrich ............... F16L 41/021 |
| 2006/0038401 A1 | | 2/2006 | Kleinbeckel et al. |
| 2009/0123221 A1 | * | 5/2009 | Marshall ............... F16L 39/005 403/24 |
| 2017/0191595 A1 | | 7/2017 | Van Scyoc |
| 2020/0182389 A1 | * | 6/2020 | Frère ..................... F16K 15/063 |
| 2021/0207759 A1 | | 7/2021 | Schulz et al. |

FOREIGN PATENT DOCUMENTS

FR    1 310 862    12/1961

OTHER PUBLICATIONS

French Search Report for corresponding FR 2112048, Jun. 9, 2022.

* cited by examiner

*Primary Examiner* — Umashankar Venkatesan
(74) *Attorney, Agent, or Firm* — Elwood L. Haynes

(57) ABSTRACT

A detachable coupling device with automatic closure for the transport of fluid, including two fluid transport pipes extending in a longitudinal direction and each having, at one connection end, a valve mechanism, the device also including an external tube disposed around each transport pipe and, in the coupled position, the two connection ends are configured to be relatively longitudinally displaceable between a first configuration, in which the valve mechanisms are closed, and a second configuration, in which the valve mechanisms are open, the transition from the first configuration to the second configuration being realized by a relative longitudinal movement of the two valve mechanisms close to one another.

16 Claims, 2 Drawing Sheets

COUPLING DEVICE AND METHOD

CROSS REFERENCE TO RELATED APPLICATIONS

This application claims the benefit of priority under 35 U.S.C. § 119 (a) and (b) to French Patent Application No. 21120489, filed Nov. 15, 2021, the entire contents of which are incorporated herein by reference.

BACKGROUND

The invention relates to a coupling device and method.

More particularly, the invention relates to a detachable coupling device with automatic closure for the transport of cryogenic fluid, comprising two fluid transport pipes extending in a longitudinal direction and each comprising, at one connection end, a valve mechanism configured to automatically close the pipe when the connection ends are separated and to enable the pipe to be opened when the connection ends are coupled, the device moreover comprising an external tube disposed around each transport pipe and defining a space under vacuum for the thermal insulation of the transport pipe, in the coupled position the two connection ends are configured to be relatively longitudinally displaceable between a first, closed configuration, in which the valve mechanisms are closed and prevent fluidic communication between the two transport pipes, and a second, open configuration, in which the valve mechanisms are open and ensure fluidic communication between the two transport pipes.

The coupling devices for the transfer of cryogenic fluids (for example liquefied hydrogen) make use of a "Johnston" type fitting. The known devices require the line to be purged before and after coupling.

Other connection types exist for liquefied natural gas applications. However, the latter are not suitable for hydrogen for effectiveness and safety reasons. In particular, they do not offer the thermal insulation required.

One problem of the coupling devices for the transfer of liquid hydrogen is the risk of trapping air inside a dead volume internal to the fitting. This causes the risk of transporting solid air (oxygen) towards tanks or other components.

SUMMARY

An object of the present invention is to overcome all or some of the drawbacks of the prior art noted above.

To that end, the coupling device according to the invention, moreover in accordance with the generic definition it is given in the preamble above, is essentially characterized in that the transition from the first, closed configuration to the second, open configuration is realized by a relative longitudinal movement of the two fluid transport pipes close to one another and/or by a relatively movement of the two valve mechanisms close to one another, wherein the connection end of a first one of the two pipes comprises a sealing ring secured to the external tube, the sealing ring comprising a set of seal(s) that is (are) configured to ensure sealing with respect to the outside between the two connection ends when the two connection ends are coupled, the sealing ring being movable in translation in the longitudinal direction relative to the external tube between two distinct positions during the transition from the first, closed configuration to the second, open configuration.

Furthermore, embodiments of the invention may have one or more of the following features:

- the device comprises a return member, for example a spring, which urges the sealing ring towards its first position,
- the sealing ring comprises an internal face provided with at least one seal which sealingly interacts with the tube to which the sealing ring is secured,
- the at least one seal located on the internal face of the sealing ring ensures sealing by being compressed in a plane which is not parallel to the longitudinal direction and/or compressed in a plane which is parallel to the longitudinal direction,
- the sealing ring comprises an end face provided with at least one seal which is intended to sealingly interact with the other connection end when the two connection ends are coupled,
- the at least one seal located on the end face ensures sealing by being compressed in a plane which is not parallel to the longitudinal direction,
- one of the connection ends comprises a movable locking member displaceable between a locking position, in which it is ensured that the two coupled connection ends are secured to one another, and an unlocking position, in which it is not ensured that the two coupled connection ends are secured to one another,
- in its locking position, the locking member ensures that the sealing ring borne by a first connection end is secured to the other connection end,
- in the first, closed configuration, the valve mechanisms are in contact or are not in contact, and, in the second, open configuration, the valve mechanisms are in contact and exert a thrust force towards one another that ensures the displacement and opening thereof,
- the valve mechanism of a first one of the transport pipes comprises a movable valve urged by a return member towards a closed position against a fixed seat disposed around the valve,
- the valve mechanism of the second transport pipe comprises a reference valve and a movable seat disposed around the reference valve, the movable seat being urged towards a closed position against the reference valve by a return member,
- in the first, closed configuration, the reference valve of the second transport pipe does not push the movable valve of the first transport pipe out of its seat, keeping the valve mechanism closed, the movable seat being in its closed position against the reference valve, and, in the second, open configuration, the connection ends are in contact and the reference valve of the second transport pipe pushes the movable valve of the first transport pipe out of its seat and causes the valve mechanism to open,
- the valve mechanism of one of the two transport pipes is housed inside its external tube to a relatively more recessed extent than the other valve mechanism is in its tube, so as to form a male and female type system in which, in the joined position of the two transport pipes, one connection end enters the other connection end,
- the space under vacuum between the external tube and the transport pipe comprises a thermal insulator, for example of multilayer type "MLI",
- the reference valve of the second transport pipe is fixed and non-displaceable with respect to its transport pipe,
- the valve mechanism of the second transport pipe is located flush with the end face of this second transport pipe, the method for separating two coupled transport pipes comprises a step of closing the two valve mechanisms via a relative movement of the two fluid transport pipes away from one another and/or a relative displacement of at least part of the two valve mechanisms with retention of the sealed coupling of the two connection ends, and then a step of separating the two connection ends, during the transition from the step of closing the two valve mechanisms to the separation step, the device passes through the first, closed configuration, in which the two connection ends remain coupled in a sealed manner with respect to the outside and the two valve mechanisms are in the closed position, the step of closing the two valve mechanisms being performed via a relative movement of the two fluid transport pipes away from one another and/or a relative displacement of at least part of the two valve mechanisms.

in the coupled position, the displacement between the first, closed configuration and the second, open configuration is performed manually and/or in a manner controlled by a control member, the movable locking member comprises a locking ring mounted so as to be movable in translation in the longitudinal direction on one connection end.

The invention also relates to a method for coupling two transport pipes of a device according to any one of the features above or below, comprising a step of moving the two connection ends close to one another, in which the two connection ends are coupled in a sealed manner with respect to the outside, a step of placing the two valve mechanisms in contact, a step of opening two valve mechanisms, and a step of causing cryogenic fluid to flow from one pipe to the other.

According to a possible particular feature, before the step of opening the two valve mechanisms, the method has an intermediate configuration in which the two connection ends are coupled in a sealed manner with respect to the outside and the two valve mechanisms are in the closed position, the step of opening the two valve mechanisms being performed via an additional relative movement of the two fluid transport pipes close to one another and/or a relative displacement of at least part of the two valve mechanisms.

The invention may also relate to any alternative device or method comprising any combination of the features above or below within the scope of the claims.

BRIEF DESCRIPTION OF THE DRAWINGS

Further particular features and advantages will become apparent on reading the description below, which is given with reference to the figures, in which.

DETAILED DESCRIPTION OF PREFERRED EMBODIMENTS

Figure 1:
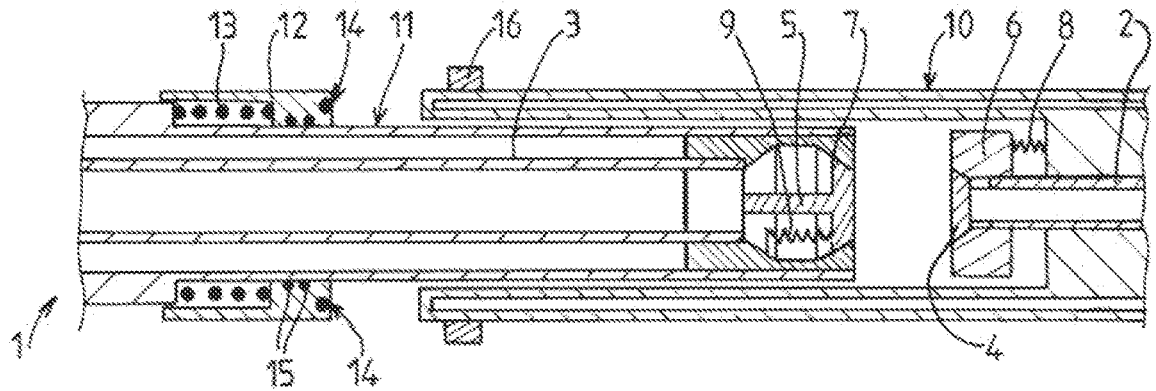
FIG. 1 shows a schematic and partial view in longitudinal section, illustrating an exemplary embodiment of a coupling device in a first, separated state.

The coupling device 1 illustrated in FIG. 1 may be a "quick-action"-type detachable fitting with automatic closure for the transport of cryogenic fluid. This device 1 forms for example a fluidic connection between a (movable or fixed) distributor and a (respectively fixed or movable) receiver, for example for transferring or filling fluid from a source into a receiver, such as a tank.

The device comprises two fluid transport pipes 2, 3 extending in a longitudinal direction. At one connection end, each pipe 2, 3 comprises a valve mechanism configured to automatically close the pipe 2, 3 when the connection ends are separated (cf. FIG. 1) and to enable the pipe 2, 3 to be opened when the connection ends are coupled (cf. FIG. 4 or FIG. 6).

The device 1 moreover comprises an external tube 10, 11 disposed around each transport pipe 2, 3. The external tube 10, 11 defines a space under vacuum for thermal insulation around the transport pipe 2, 3.

The space under vacuum between the external tube 10, 11 and the transport pipe 2, 3 comprises for example a thermal insulator, for example of multilayer type "MLI".

Figure 3:
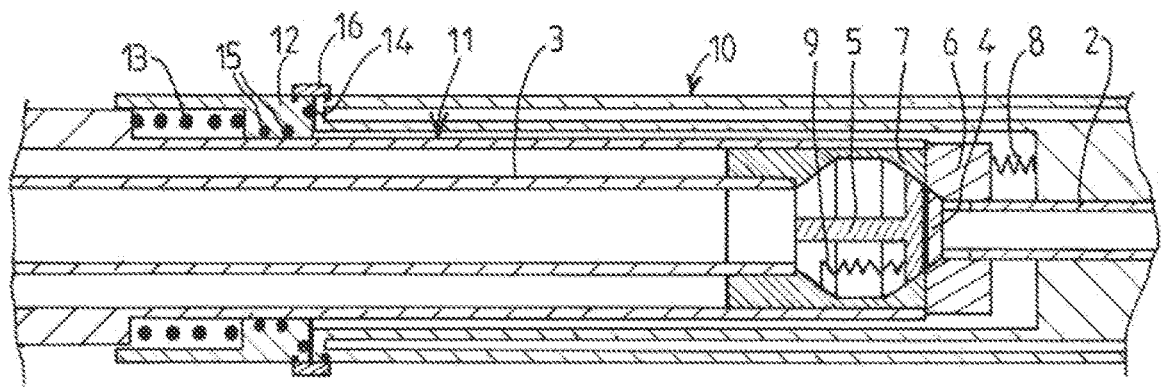
FIG. 3 shows a schematic and partial view in longitudinal section, illustrating the same coupling device in a third, coupled and sealed state in which it is locked and the valves are closed (first, closed configuration)
Figure 4:
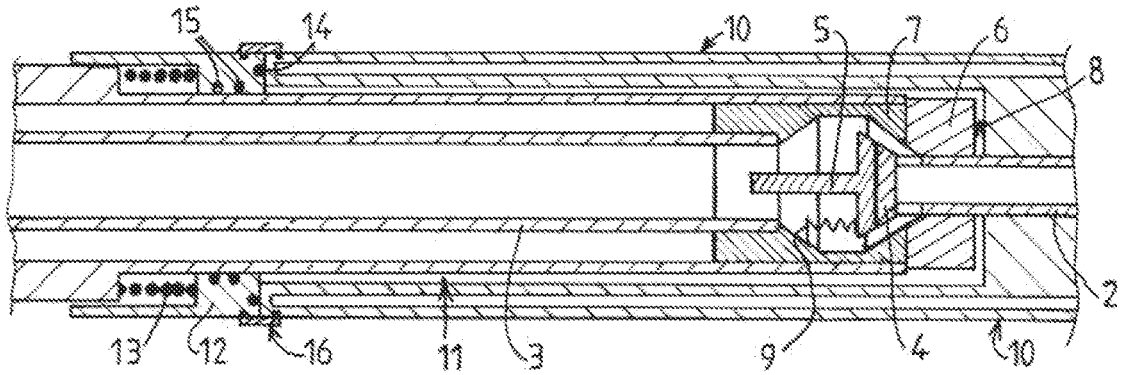
FIG. 4 shows a schematic and partial view in longitudinal section, illustrating the same coupling device in a fourth, coupled and sealed state in which it is locked and the valves are open (second, open configuration)

In the coupled (sealed) position, the two connection ends are configured to be relatively longitudinally displaced between a first, closed configuration, in which the valve mechanisms are closed and prevent fluidic communication between the two transport pipes 2, 3 (cf. FIG. 2 or FIG. 3), and a second, open configuration, in which the valve mechanisms are open and ensure fluidic communication between the two transport pipes 2, 3 (cf. FIG. 4).

The transition from the first, closed configuration to the second, open configuration is realized by an additional relative longitudinal movement of the two fluid transport pipes 2, 3 close to one another and/or by a relative movement of the two valve mechanisms 4, 6, 8, 5, 7, 9 close to one another.

As illustrated, the valve mechanism 4, 6, 8 of one 2 of the two transport pipes is preferably housed inside its external tube 10 to a relatively more recessed extent than the other valve mechanism 5, 7, 9 is in its tube 11, so as to form a male and female type system in which, in the joined/coupled position of the two transport pipes 2, 3, one connection end enters the other connection end.

As illustrated, the connection end of a first one 3 of the two pipes comprises a sealing ring 12 secured to the external tube 11.

The sealing ring 12 comprises a set of seal(s) 14, 15 which is (are) configured to ensure sealing with respect to the outside between the two connection ends when the two connection ends are coupled. This sealing ring 12 is for example mounted so as to be movable in translation in the longitudinal direction relative to the external tube 11 between two distinct positions during the transition from the first, closed configuration to the second, open configuration.

The device preferably comprises a return member 13, for example a spring, in particular a compression spring, which urges the sealing ring 12 towards its first position.

The sealing ring 12 comprises an internal face provided with at least one seal 15 (and preferably at least two seals 15) which sealingly interacts with the tube 11 to which the sealing ring 12 is secured.

The sealing ring 12 moreover comprises an end face intended to bear against the other connection end in the coupled position. This end face is provided with at least one seal 14 which is intended to sealingly interact with the other connection end when the two connection ends are coupled (cf. FIG. 2).

The sealing ring 12 thus realizes (or contributes to) the sealed link between the two coupled connection ends (with the seals 14, 15).

As illustrated, the at least one seal 15 located on the internal face of the sealing ring 12 can ensure sealing by being compressed in a plane which is parallel to the longitudinal direction. Similarly, the at least one seal 14 located on the end face can ensure sealing by being compressed in a plane which is not parallel to the longitudinal direction, in particular in a plane perpendicular to the longitudinal direction of the pipe.

Of course, this arrangement is not limiting; any other arrangement type of axial or radial seal(s) may be envisaged (cf. FIG. 5, which will be described below).

Radial seals seal the coupling before the valve mechanisms come into contact (without being open). This can trap a non-zero dead volume. However, these radial seals make it possible to displace one part with respect to the other. The axial seal(s) seal the coupling but do not make it possible to axially displace one part with respect to the other. However, this seal configuration is advantageous for minimizing the dead/trapped volumes during the coupling.

As illustrated, one of the connection ends may comprise a movable locking member 16 configured to lock and secure the sealed coupling. The locking member 16 is displaceable between a locking position, in which it is ensured that the two coupled connection ends are secured to one another (cf. FIG. 3 or FIG. 4), and an unlocking position, in which it is not ensured that the two coupled connection ends are secured to one another (cf. FIG. 2 for example).

As illustrated, in its locking position, the locking member 16 can ensure for example that the sealing ring 12 borne by a first connection end is mechanically secured to the other connection end.

This locking preferably does not enable any displacement of the two ends.

This mechanical locking 16 may be necessary to lock the sealing ring 12, in particular when the opening of the valves has ended. This is because, in this configuration, without this locking, the pressure force of the fluid in the device can be greater than the load of the spring 13 that pushes the sealing ring against the other connection end.

The locking member 16 may be mounted on one of the two connection ends.

Figure 2:
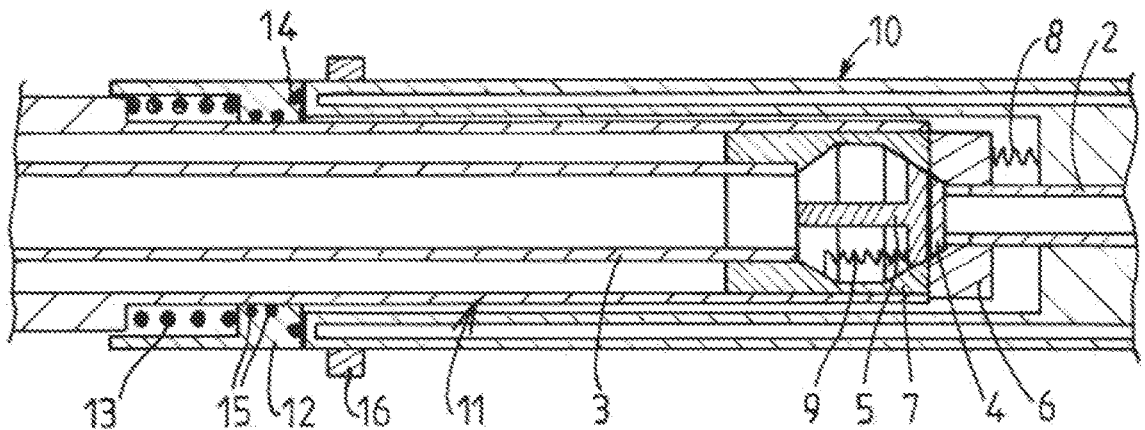
FIG. 2 shows a schematic and partial view in longitudinal section, illustrating the same coupling device in a second, coupled and sealed state in which it is not locked and the valves are closed (first, closed configuration)

In the exemplary embodiment of FIG. 2, in the first, closed position (sealed coupling and closed valves), the valve mechanisms are in contact (or flush with one another). Of course, as a variant, in this first, closed configuration the valve mechanisms might not be in contact (or even might be remote from one another).

The valve mechanism 5, 7, 9 of a first one of the transport pipes 3 may comprise a movable valve 5 urged by a return member 9 (spring for example) towards a closed position against a fixed seat 7 disposed around the valve 5.

The valve mechanism of the second pipe may be of the same type. However, as illustrated, the valve mechanism 4, 6, 8 of the second transport pipe 2 may comprise a fixed reference valve 4 and a movable seat 6 disposed around the reference valve 4. The movable seat 6 is urged towards a closed position against the reference valve 4 by a return member 8, for example a spring.

As illustrated in FIG. 2 and FIG. 3, in the first, closed configuration, the reference valve 4 of the second transport pipe 3 does not push the movable valve 5 of the first transport pipe 2 out of its seat 7. This keeps the valve mechanism closed and prevents the flow of fluid. The movable seat 6, for its part, is in its closed position against the reference valve 4.

By contrast, in the second, open configuration (cf. FIG. 4), the connection ends are in contact and the reference valve 4 of the second transport pipe 3 pushes the movable valve 5 of the first transport pipe 2 out of its seat 7 and causes the valve mechanism to open. Similarly, the valve mechanism 4, 6, 8 of the second pipe 2 is open. For example, the movable seat 6 is separated from the reference valve 4 counter to the pressure of the spring 8.

The relative movement-away from the second, open configuration to the first, closed configuration causes the valve mechanisms to automatically close (in particular via the return members).

Thus, the sealing ring 12 makes it possible to relatively displace the two coupled connection ends with retention of the sealing between them.

Because of its mobility relative to its connection end, the ring may thus form an end of one connection end that is retractable with respect to the other, retaining the sealing between the two connection ends during their relative movement in the longitudinal direction.

The coupling may comprise the following steps:
separated state, valve mechanisms closed cf. FIG. 1,
coupled, sealed and non-locked state, valve mechanisms still closed cf. FIG. 2,
coupled, sealed and locked state, valve mechanisms still closed cf. FIG. 3,
coupled, sealed and locked state, valve mechanisms open cf. FIG. 4.

In a positionally possible alternative, the sequence of use might be as follows:
inserting the movable connection end into or around the fixed connection end (the sealing is not yet realized, the valves are closed),
locking the link, for example by locking the sealing ring 12 (the sealing between the connection ends is realized, the valves are closed),
displacement of the movable part towards the fixed part to open the valves.

This relative displacement of the connection ends to open the valves (and the reverse movement) can be implemented by a quick-action connection mechanism of any kind, comprising mating attachment members on the two connection ends, for example a mechanism of bayonet type, lever type, ram type, or another type.

In this non-limiting example, the sealing ring 12 is secured to the (fixed or movable) male connection end, but could be borne by the other (female and movable or fixed) connection end.

This sealing ring 12 is preferably mounted on the outer part, which is relatively hot, of the coupling device (as opposed to the cryogenic part close to the valve mechanisms in contact with the cryogenic fluid).

The sealing ring 12 is preferably mounted on the male-type and movable connection end of the device 1 (this limits the dead volumes in the coupling). However, any other configuration is conceivable.

Figure 6:
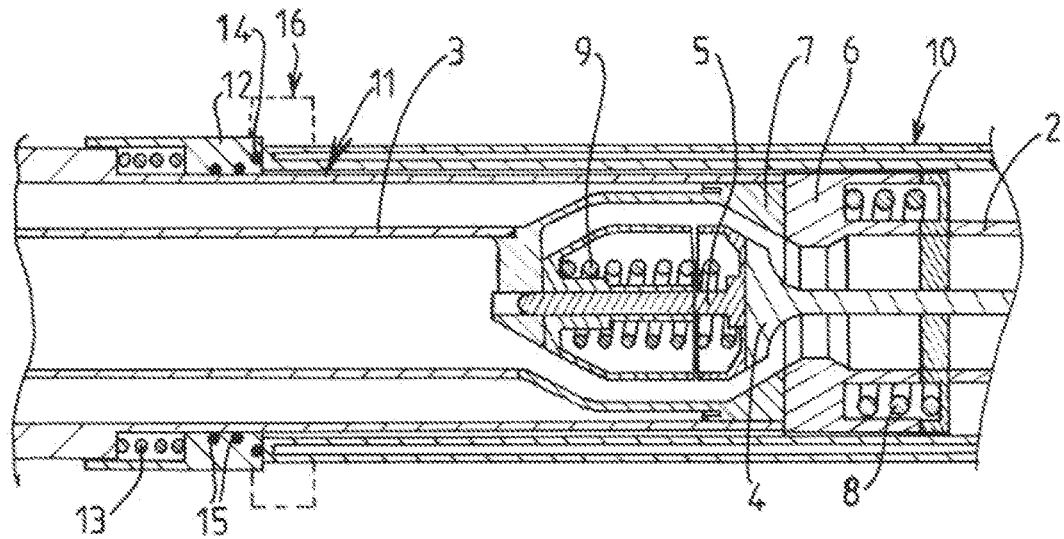
FIG. 6 shows a schematic and partial view in longitudinal section, illustrating yet another variant embodiment of the coupling device in a coupled and sealed state in which the valves are open (second, open configuration).

The variant of FIG. 6 corresponds to the state of FIG. 4 (sealed coupling and closed valve mechanisms) and illustrates examples of valve mechanisms in the open position. The same elements are denoted by the same reference numerals. In addition, for the sake of simplification, this illustrated variant does not have a locking ring (optional).

Figure 5:
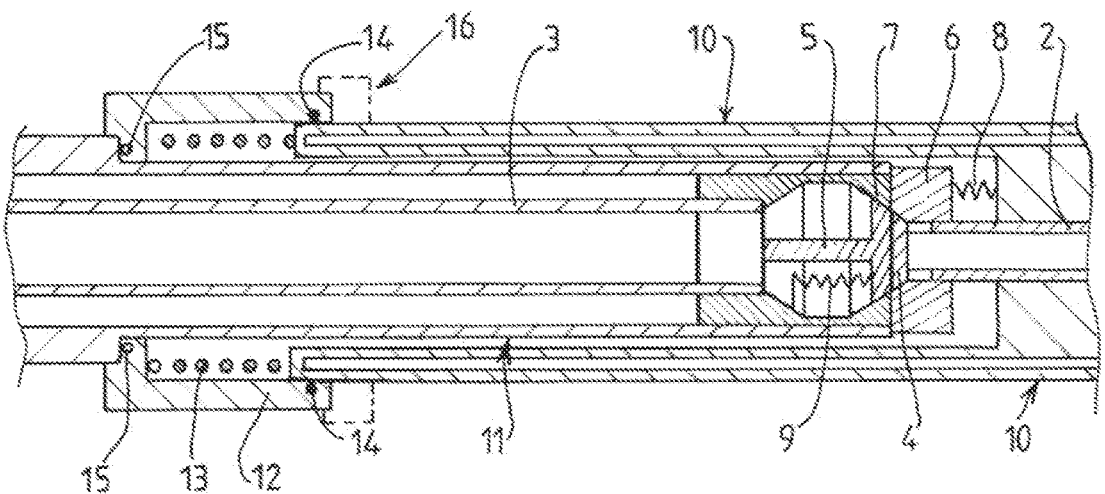
FIG. 5 shows a schematic and partial view in longitudinal section, illustrating another variant embodiment of the coupling device in a coupled and sealed state in which the valves are closed (first, closed configuration)

The variant of FIG. 5 corresponds to the state of FIG. 2 (sealed coupling and closed valve mechanisms). In this variant, a seal 14 of the end face ensures radial sealing (compression in a plane parallel to the longitudinal direction). In addition, at the internal seal 15 there is axial sealing (compression in a plane perpendicular to the longitudinal direction).

Depending on the balance of forces and in particular the calibration of the return member 13 that urges the sealing ring 12, the locking member described above may possibly be left out.

The locking and actuation of the valve mechanisms can be done directly between the fixed connection end and the movable connection end without entailing the sealing ring 12. In this case, to obtain the sealing, in particular via an axial seal, this seal may be pressed (for example by a spring or by pressure).

One advantageous solution is to provide a radial-type seal on the female part and an axial seal on the male part. This makes it possible to press the axial seal 15 by virtue of the pressure exerted by the fluid in the device.

The invention thus proposes a rapid, simple and safe device 1 for repeatably connecting and disconnecting pipes and/or tanks for cryogenic fluids, such as liquid hydrogen. The connection ends can easily be handled manually.

The device minimizes the entry of heat into the cold part. The outer part is not at cryogenic temperature.

The connection/disconnection can be performed in successive steps: i) coupling and locking, if appropriate (heat-tightness) ii) opening the valve mechanisms (fluid transfer) via an additional movement, towards or away, permitted by the sealing ring 12 iii) closing the valve mechanisms (cryogenic sealing) iv) unlocking and separation.

In addition, the device may incorporate an emergency separation system ("breakaway").

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A detachable coupling device with automatic closure for the transport of cryogenic fluid, comprising two fluid transport pipes extending in a longitudinal direction and each comprising, at one connection end, a valve mechanism configured to automatically close the pipe when the connection ends are separated and to enable the pipe to be opened when the connection ends are coupled, the device comprising an external tube disposed around each transport pipe and defining a space under vacuum for the thermal insulation of the transport pipe, wherein, in the coupled position, the two connection ends are configured to be relatively longitudinally displaceable between a first, closed configuration, in which the valve mechanisms are closed and prevent fluidic communication between the two transport pipes, and a second, open configuration, in which the valve mechanisms are open and ensure fluidic communication between the two transport pipes, the transition from the first, closed configuration to the second, open configuration being realized by a relative longitudinal movement of the two fluid transport pipes close to one another and/or by a relative movement of the two valve mechanisms close to one another, wherein the connection end of a first one of the two pipes comprises a sealing ring secured to the external tube, the sealing ring being movable in translation in the longitudinal direction relative to the external tube between two distinct positions during the transition from the first, closed configuration to the second, open configuration, wherein the sealing ring comprises a set of seal(s) that is (are) configured to ensure sealing with respect to the outside between the two connection ends when the two connection ends are coupled.

2. The device according to claim 1, further comprising a return member which urges the sealing ring towards the first position.

3. The device according to claim 1, wherein the sealing ring comprises an internal face provided with at least one seal which sealingly interacts with the tube to which the sealing ring is secured.

4. The device according to claim 3, wherein the at least one seal located on the internal face of the sealing ring ensures sealing by being compressed in a plane which is not parallel to the longitudinal direction and/or compressed in a plane which is parallel to the longitudinal direction.

5. The device according to claim 1, wherein the sealing ring comprises an end face provided with at least one seal which is intended to sealingly interact with the other connection end when the two connection ends are coupled.

6. The device according to claim 5, wherein the at least one seal located on the end face ensures sealing by being compressed in a plane which is not parallel to the longitudinal direction.

7. The device according to claim 1, wherein one of the connection ends comprises a movable locking member displaceable between a locking position, thereby ensuring that the two coupled connection ends are secured to one another, and an unlocking position, in which thereby ensuring that the two coupled connection ends are secured to one another.

8. The device according to claim 7, wherein, in the locking position, the locking member ensures that the sealing ring borne by a first connection end is secured to the other connection end.

9. The device according to claim 1, wherein, in the first, closed configuration, the valve mechanisms are in contact or are not in contact, and, in the second, open configuration, the valve mechanisms are in contact and exert a thrust force towards one another that ensures the displacement and opening thereof.

10. The device according to claim 1, wherein the valve mechanism of a first one of the transport pipes comprises a movable valve urged by a return member towards a closed position against a fixed seat disposed around the valve.

11. The device according to claim 10, wherein, the valve mechanism of the second transport pipe comprises a reference valve and a movable seat disposed around the reference valve, in the first, closed configuration, the reference valve of the second transport pipe does not push the movable valve of the first transport pipe out of the seat, keeping the valve mechanism closed, the movable seat being in the closed position against the reference valve, and, in the second, open configuration, the connection ends are in contact and the reference valve of the second transport pipe pushes the movable valve of the first transport pipe out of the seat and causes the valve mechanism to open.

12. The device according to claim 1, wherein the valve mechanism of the second transport pipe comprises a reference valve and a movable seat disposed around the reference valve, the movable seat being urged towards a closed position against the reference valve by a return member.

13. The device according to claim 1, wherein the valve mechanism of one of the two transport pipes is housed inside the external tube to a relatively more recessed extent than the other valve mechanism is in the tube, so as to form a male and female type system in which, in the joined position of the two transport pipes, one connection end enters the other connection end.

14. The device according to claim 1, wherein the space under vacuum between the external tube and the transport pipe comprises a thermal insulator.

15. A method for coupling two transport pipes of a device according to claim 1, comprising a step of moving the two connection ends close to one another, in which the two connection ends are coupled in a sealed manner with respect to the outside, a step of placing the two valve mechanisms in contact, a step of opening two valve mechanisms, and a step of causing cryogenic fluid to flow from one pipe to the other.

16. The method according to claim 15, wherein, before the step of opening the two valve mechanisms, said method has an intermediate configuration in which the two connection ends are coupled in a sealed manner with respect to the outside and the two valve mechanisms are in the closed position, the step of opening the two valve mechanisms being performed via an additional relative movement of the two fluid transport pipes close to one another and/or a relative displacement of at least part of the two valve mechanisms.

* * * * *